(12) United States Patent
Mok et al.

(10) Patent No.: US 9,330,309 B2
(45) Date of Patent: May 3, 2016

(54) CORRECTING WRITING DATA GENERATED BY AN ELECTRONIC WRITING DEVICE

(71) Applicant: Google Technology Holdings LLC, Mountain View, CA (US)

(72) Inventors: Swee M. Mok, Palatine, IL (US); Mary K. Hor-Lao, Vernon Hills, IL (US); Jason Jae Hyun Koh, Vernon Hills, IL (US); Douglas A. Lautner, Round Lake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 136 days.

(21) Appl. No.: 14/135,981

(22) Filed: Dec. 20, 2013

(65) Prior Publication Data

US 2015/0177905 A1 Jun. 25, 2015

(51) Int. Cl.
| | |
|---|---|
| *G06K 9/00* | (2006.01) |
| *G06F 3/0354* | (2013.01) |
| *G06F 3/038* | (2013.01) |
| *G06F 3/0488* | (2013.01) |
| *B43K 29/00* | (2006.01) |
| *G06K 9/22* | (2006.01) |

(52) U.S. Cl.
CPC .......... *G06K 9/00402* (2013.01); *G06F 3/0383* (2013.01); *G06F 3/03545* (2013.01); *G06K 9/00436* (2013.01); *B43K 29/001* (2013.01); *G06F 3/04883* (2013.01); *G06F 2203/04106* (2013.01); *G06K 9/222* (2013.01)

(58) Field of Classification Search
CPC . G06F 3/03545; G06F 3/04883; G06F 3/033; G06F 3/0346; G06F 2203/04106; G06F 3/03542; B43K 29/001; B43K 29/005; B43K 29/08; G06K 9/224; G06K 9/222; G06K 7/10544; G06K 9/00422; G06K 9/00402; H04M 1/0285

USPC ........................................................ 345/179
See application file for complete search history.

(56) References Cited

U.S. PATENT DOCUMENTS

| | | |
|---|---|---|
| 5,902,968 A | 5/1999 | Sato et al. |
| 6,686,910 B2 | 2/2004 | O'Donnell, Jr. |

(Continued)

FOREIGN PATENT DOCUMENTS

WO 2015/095345 A1 6/2015

OTHER PUBLICATIONS

International Search Report and Written Opinion from corresponding application PCT/US2014/070888, dated Mar. 27, 2015, 14 pages.

*Primary Examiner* — Julie Anne Watko
(74) *Attorney, Agent, or Firm* — Brake Hughes Bellermann LLP

(57) ABSTRACT

In embodiments of correcting writing data generated by an electronic writing device, an electronic writing device includes a positional sensor configured to sense movement of the electronic writing device when the device is used to write on a writing surface, and to generate writing data corresponding to the movement of the electronic writing device. The device also includes a correction component that is configured to correct each sample of writing data using rotation data generated by a gyroscope. To do so, the correction component calculates an offset angle of the electronic writing device relative to a reference axis of the positional sensor based at least in part on the rotation data generated by the gyroscope. The correction component then determines a correction angle based on the offset angle, and adjusts the sample of writing data by applying the correction angle to the sample of the writing data.

13 Claims, 13 Drawing Sheets

(56) References Cited

U.S. PATENT DOCUMENTS

| | | |
|---|---|---|
| 7,342,575 B1 | 3/2008 | Hartwell et al. |
| 7,542,607 B2 | 6/2009 | Bartolome |
| 8,442,798 B2 | 5/2013 | Mathews et al. |
| 2002/0148655 A1 | 10/2002 | Cho et al. |
| 2004/0140962 A1 | 7/2004 | Wang et al. |
| 2004/0140965 A1 | 7/2004 | Wang et al. |
| 2008/0080791 A1 | 4/2008 | Carl et al. |
| 2010/0079602 A1 | 4/2010 | Napper et al. |

| Power Saving State | Surface Touch Sensor | Accelerometer | Gyroscope | Positional Sensor | Selector Component | Writing Error Alert |
|---|---|---|---|---|---|---|
| On | Off | On | Off | Off | Off | Off |
| Off | Off | Off | Off | Off | Off | Off |
| Large Pitch Angle | On | On | On | On | Off | Off |
| Paused Writing | On | On | Off | On | Off | Off |
| Small Pitch Angle | On | On | On | On | On | On |

CORRECTING WRITING DATA GENERATED BY AN ELECTRONIC WRITING DEVICE

BACKGROUND

An electronic pen can utilize sensors to detect writing movements when writing on a writing surface, such as a piece of paper. An electronic pen and a piece of paper are independent objects, and thus the electronic pen's recorded writing may be tilted at an arbitrary angle relative to the piece of paper causing the written words to appear "rotated" compared to the user's intended orientation.

BRIEF DESCRIPTION OF THE DRAWINGS

Embodiments of correcting writing data generated by an electronic writing device are described with reference to the following Figures. The same numbers may be used throughout to reference like features and components that are shown in the Figures.

DETAILED DESCRIPTION

In embodiments of correcting writing data generated by an electronic writing device, an electronic writing device includes a positional sensor configured to sense movement of the electronic writing device when the device is used to write on a writing surface, and to generate writing data corresponding to the movement of the electronic writing device. The device also includes a gyroscope configured to sense rotation of the electronic writing device and generate rotation data corresponding to the rotation.

In various embodiments, a correction component is configured to correct each sample of writing data using the rotation data generated by the gyroscope. To do so, the correction component calculates an offset angle of the electronic writing device relative to a reference axis of the positional sensor based at least in part on the rotation data generated by the gyroscope. The correction component then determines a correction angle based on the offset angle, and adjusts the sample of writing data by applying the correction angle to the sample of the writing data.

While features and concepts of correcting writing data generated by an electronic writing device can be implemented in any number of different devices, systems, and/or configurations, embodiments of correcting writing data generated by an electronic writing device are described in the context of the following example devices, systems, and methods.

Figure 1:
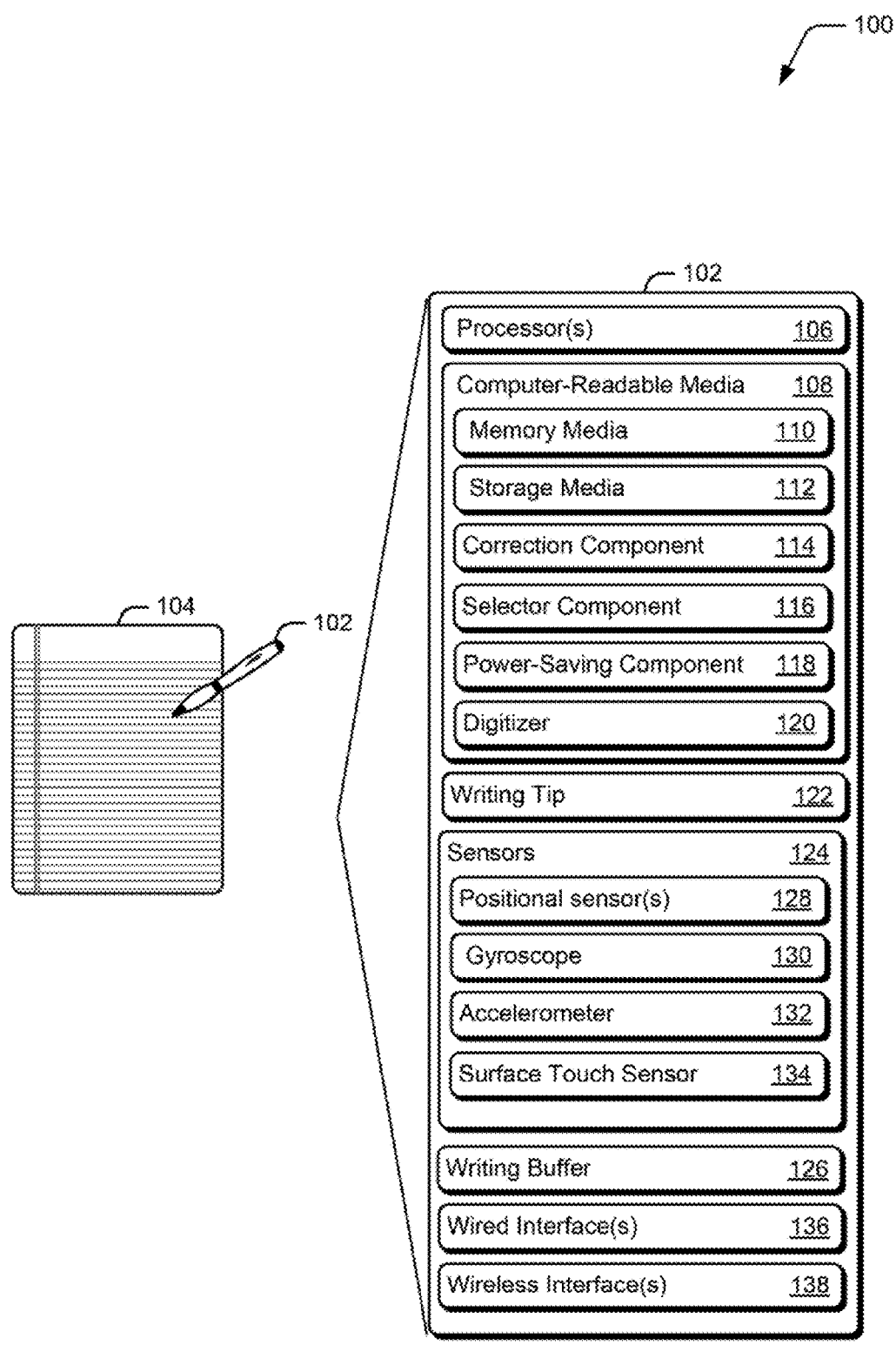
FIG. 1 illustrates an example system in which embodiments of correcting writing data generated by an electronic writing device can be implemented.

FIG. 1 illustrates an example environment 100 in which embodiments of correcting writing data generated by an electronic writing device can be implemented. Example environment 100 includes an electronic writing device 102 that is configured to write on a writing surface 104. Electronic writing device 102 is illustrated in example 100 as an electronic pen, but may also be implemented as an electronic mouse or any other type of electronic writing device. Writing surface 104 may be implemented as a piece of paper, but may also be implemented as other surfaces, such as a poster board, a white board, a chalk board, a tabletop, or a tablet. As described herein, "writing" includes any type of writing or drawing on writing surface 104 by electronic writing device 102, such as scripting, printing, signing, drafting, illustrating, tracing, diagramming, marking, or scribbling, to name just a few.

Electronic writing device 102 includes processors 106 and computer-readable media 108, which may include memory media 110 and storage media 112. Computer-readable media 108 also includes a correction component 114, a selector component 116, a power-saving component 118, and a digitizer 120, which will be described in more detail below.

Electronic writing device 102 further includes a writing tip 122, sensor(s) 124, and a writing buffer 126. Writing tip 122 is usable to write on writing surface 104, and may be implemented, by way of example and not limitation, as an ink tip or a pencil tip. For example, writing tip 122 may enable electronic writing device 102 to write in ink or in pencil on a piece of paper.

Sensors 124 are configured to sense movement of electronic writing device 102 when writing on writing service 104, and to generate writing data corresponding to the movement of electronic writing device 102. For example, the movement sensed by sensors 124 can be passed to digitizer 120 which converts the movement into digital writing data. In one or more embodiments, sensors 124 include positional sensor(s) 128 and a gyroscope 130. Sensors 124 may also include an accelerometer 132 and/or a surface touch sensor 134.

In one or more implementations, positional sensors 128 may be implemented as optical sensors, similar to those used in computer mouse input devices. Optical sensors are configured to sense movement of electronic writing device 102 in the "x" and "y" directions, and to generate data in the form of x-coordinates and y-coordinates corresponding to the writing of the electronic writing device 102. As described herein, data generated in the form of x-coordinates and y-coordinates corresponding to the writing of the electronic writing device 102 will be referred to as "writing data". Writing buffer 126 is configured to store the writing data generated by positional sensors 128.

Gyroscope 130 may be implemented as a 3-axis gyroscope, and positioned on electronic writing device 102 so that the sensor on its z-axis is aligned along a longitudinal axis of the electronic writing device. For example, when electronic writing device 102 is implemented as a pen the sensor on the z-axis of the gyroscope will be aligned to the longitudinal axis of the pen that runs from writing tip 122 to the top of the pen. Gyroscope 130 also includes an x-axis and a y-axis sensor that are positioned on electronic writing device 102 orthogonal to the z-axis. Gyroscope 130 is configured to sense rotation of electronic writing device 102 in three dimensions using the x-axis, y-axis, and z-axis.

Accelerometer 132 may be implemented as a 3-axis accelerometer and is configured to sense acceleration of electronic writing device 102 in the z, y, and z directions.

Surface touch sensor 134 is configured to sense when writing tip 122 of electronic writing device 102 is in contact with writing surface 104, and thus can be used to indicate whether electronic writing device 102 is writing on writing surface 104.

Electronic writing device 102 may also include one or more wired interface(s) 136 and/or wireless interface(s) 138 that are configured to communicate writing data stored in writing buffer 126 to an external computing device. For example, wired interface 136 may be implemented as a universal serial bus (USB) device that can be inserted into a computing device to transfer the data in writing buffer 126 to the computing device. As another example, wireless interface 138 may be implemented as a Bluetooth™ device configured to wirelessly communicate writing data in writing buffer 126 to an external computing device that is also equipped with a Bluetooth™ device.

Electronic writing device 102 can also be implemented with any number and combination of differing components as further described with reference to the example device shown in FIG. 13.

Correction Component

Electronic writing device 102 can utilize positional sensor 128 to detect writing movements on writing surface 104. If the user writes carefully on writing surface 104 while keeping the electronic writing device aligned to the positional sensor's reference axis, the writing data generated by positional sensor 128 will be aligned to the writing on writing surface 104.

Figure 2:
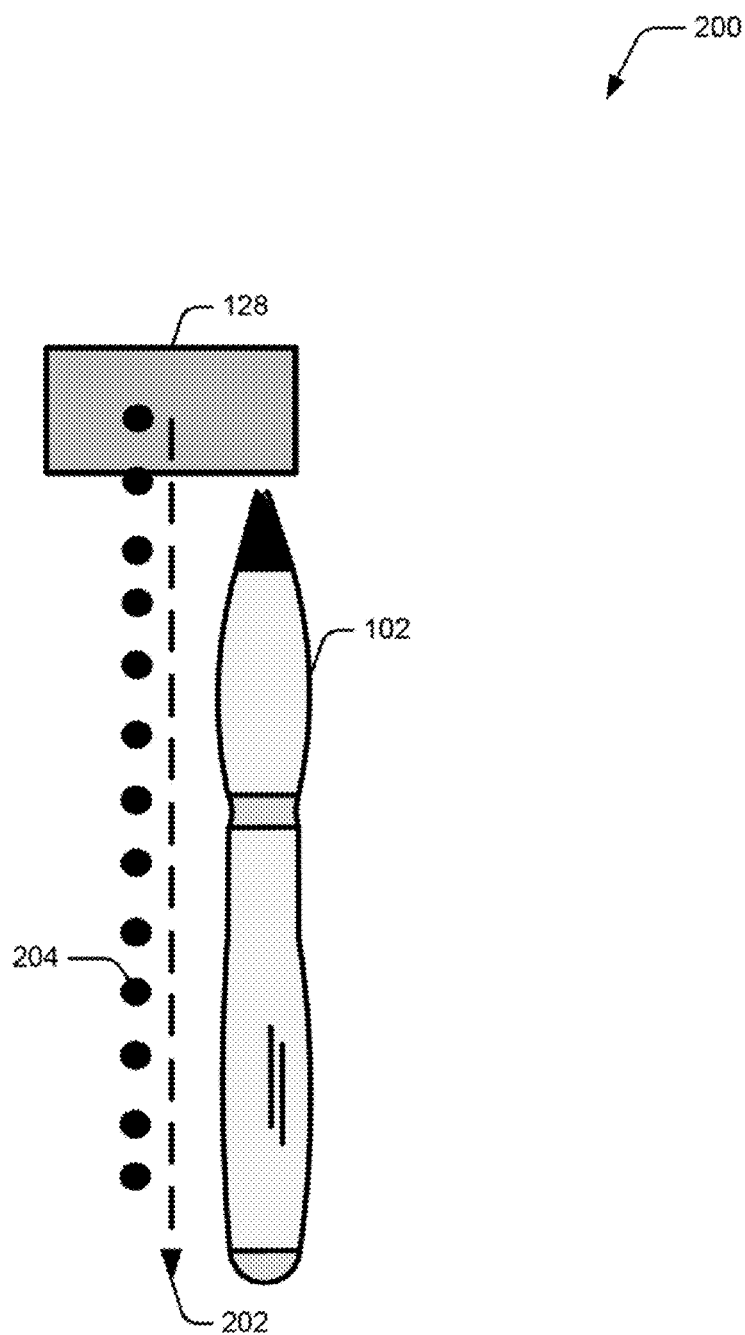
FIG. 2 illustrates an example of writing with an electronic writing device when the device is aligned to a reference axis of a positional sensor.

Consider, for example, FIG. 2 which illustrates an example 200 of writing with electronic writing device 102 when the device is aligned to a reference axis of a positional sensor. In FIG. 2, electronic writing device 102 writes a line 202 while aligned to a reference axis of positional sensor 128. Line 202 is written in a straight line perpendicular to a horizontal axis of writing surface 104. Since the reference axis of the positional sensor is aligned to electronic writing device 102, the writing data 204 generated by positional sensor 128 matches the physical writing of line 202. Note that positional sensor 128 is illustrated in FIG. 2 as a large rectangular shaded box for illustrative purposes only. Positional sensor 128 is representative of a positional sensor that is much smaller than illustrated in FIG. 2 (e.g., in the order of millimeters).

However, requiring the user to write while keeping electronic writing device 102 aligned to the reference axis of positional sensor 128 is not a realistic demand to place on the user. In the real world, users will twist and turn electronic writing device 102 about writing tip 122 when writing. Because electronic writing device 102 and writing surface 104 are independent objects, positional sensor 128 may not know the orientation of writing surface 104 relative to electronic writing device 102 as the user twists and turns the device. As a result, positional sensor 128 may output distorted writing data if the positional sensor moves across writing surface 104 while oriented away from the positional sensor's reference axis. More particularly, each sample of writing data output by positional sensor 128 for each sampling time will be offset by an angle proportional to the positional sensor's current deviation angle from the positional sensor's default reference axis. As a result, a word written by electronic writing device 102 will look "distorted" or "rotated" compared to the actual writing on writing surface 104.

Figure 3:
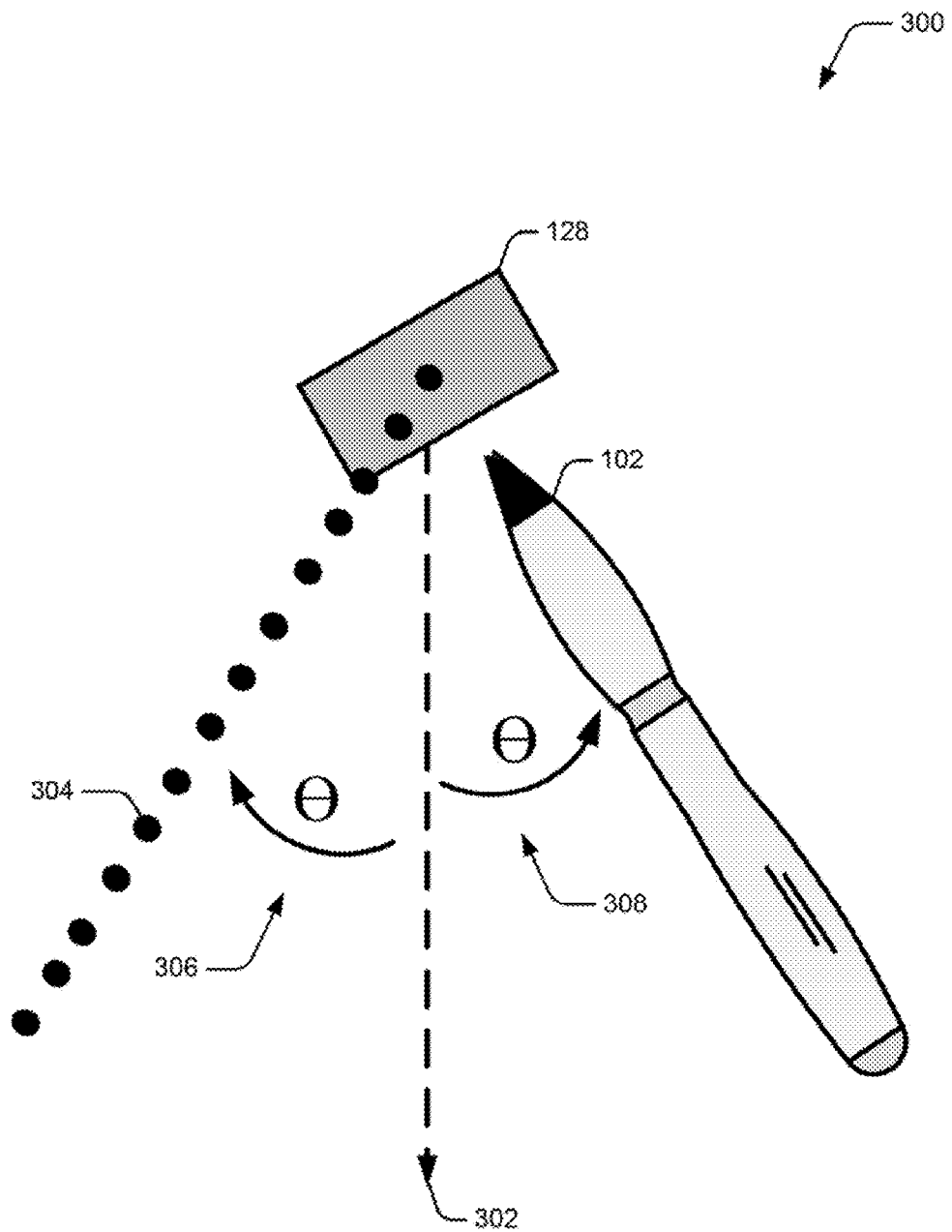
FIG. 3 illustrates an example of writing with the electronic writing device when the device is held at an offset angle relative to the reference axis of the positional sensor.

Consider, for example, FIG. 3 which illustrates an example 300 of writing with electronic writing device 102 when the device is held at an offset angle relative to the reference axis of the positional sensor. In FIG. 3, electronic writing device 102 again writes a line 302. Similar to line 202 in FIG. 2, line 302 is written in a straight line perpendicular to the horizontal axis of writing surface 104. In this example, however, writing data 304 generated by positional sensor 128 has an offset angle 306 that is proportional to an offset angle 308 corresponding to the way in which electronic writing device 102 is held by the user. Offset angle 308 corresponds to the "yaw" angle of electronic writing device 102 as the device swings back and forth in space about writing tip 122 while writing.

In order to compensate for this offset angle, correction component 114 is configured to determine a correction angle for each sample of writing data using data received from gyroscope 130. To do so, correction component 114 first sets an initial offset angle to an initial value. In one or more embodiments, the initial offset angle is set to an initial value of 0. Next, correction component 114 reads a sample of writing data from positional sensor 128 of electronic writing device 102. The sample of writing data may include an offset angle that is proportional to the offset angle of electronic writing device 102 relative to the reference axis of the positional sensor.

Figure 4:
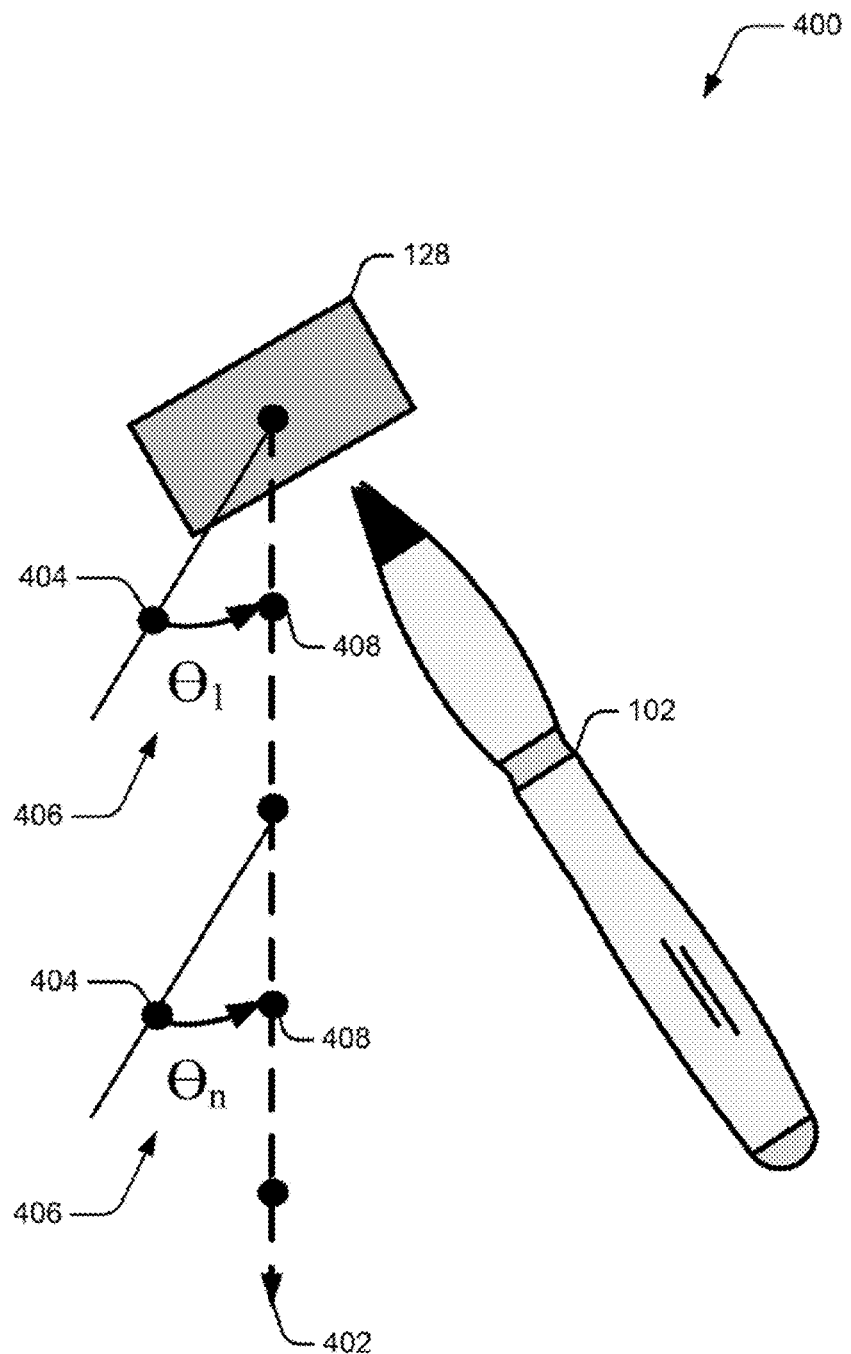
FIG. 4 illustrates an example of correcting writing data using rotation data generated by a gyroscope.

Consider, for example, FIG. 4 which illustrates an example 400 of correcting writing data using rotation data generated by a gyroscope. Similar to example 300, in example 400 electronic writing device 102 is held at an offset angle relative to the reference axis of the positional sensor while writing a line 402. As such, each sample of writing data 404 generated by positional sensor 128 has an offset angle that is proportional to an offset angle of electronic writing device 102 relative to the reference axis of the positional sensor.

Correction component 114 uses rotation data from gyroscope 130 to calculate the offset angle for each sample of writing data. The rotation data may correspond to a rotation rate (e.g., angular velocity) of electronic writing device 102. The offset angle is calculated by integrating the rotation data. For the first sample of writing data, correction component 114 determines the correction angle by adding the calculated offset angle to the initial offset angle. For each subsequent sample of writing data, the previously-calculated offset angle is added to the offset angle calculated for the current sample of writing data to calculate the correction angle.

Correction component 114 then applies the correction angle to the sample of writing data to adjust the sample of the writing data. This adjustment may be made for each sample of writing data read by the positional sensor, and is made during each sampling time of positional sensor 128. In FIG. 4, for example, correction component 114 adjusts each sample of writing data 404 by applying correction angle 406 to each sample to generate corrected writing data 408. Note that corrected writing data 408 is aligned with the actual line 402 written by the user on writing surface 104. The corrected writing data may then be stored in writing buffer 126.

Correction component 114 adjusts the writing data by adjusting the X-coordinate and Y-coordinate of each sample of writing data. In one or more implementations, an adjusted X-coordinate is calculated by multiplying the X-coordinate of the writing data by a cosine of the correction angle. An adjusted Y-coordinate of each sample of writing data is calculated by multiplying the Y-coordinate of the writing data by a sine of the correction angle.

Figure 5:
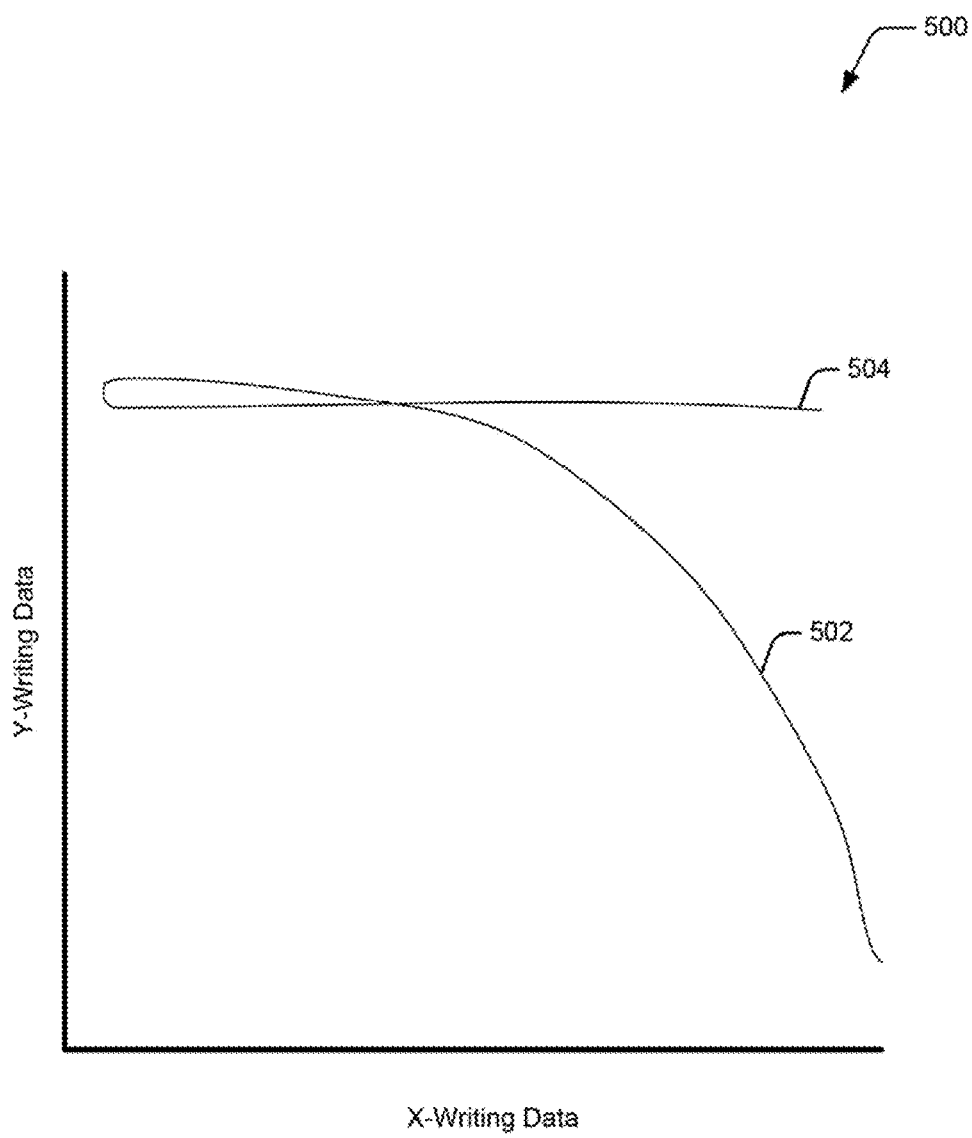
FIG. 5 illustrates an example of un-corrected writing data compared to corrected writing data.

FIG. 5 illustrates an example 500 of un-corrected writing data compared to corrected writing data. In this example, un-corrected writing data 502 is generated when electronic writing device 102 writes a horizontal line from a left edge of writing surface 104 to a right edge of writing surface 104. Un-corrected writing data 502 does not account for the electronic writing device's offset angle and thus has distortions that morph the writing data into a curved line. Correction component 114 applies correction angles to each sample of the un-corrected writing data 502 to generate corrected writing data 504. Note that corrected writing data 504 is a relatively straight line which corresponds to the writing of electronic writing device 102 on writing surface 104.

Writing Tip Offset

In one or more implementations, electronic writing device 102 is configured with a writing tip offset value to account for the offset distance from writing tip 122 of electronic writing device 102 to the position of positional sensor 128 on the device. For example, positional sensor 128 may be positioned slightly offset from the centerline of the longitudinal axis of the electronic writing device, which runs from writing tip 122 to the top of the device. As a result, movement detected by the positional sensor may be offset based on the distance of the positional sensor from the centerline of the electronic writing device.

Figure 6:
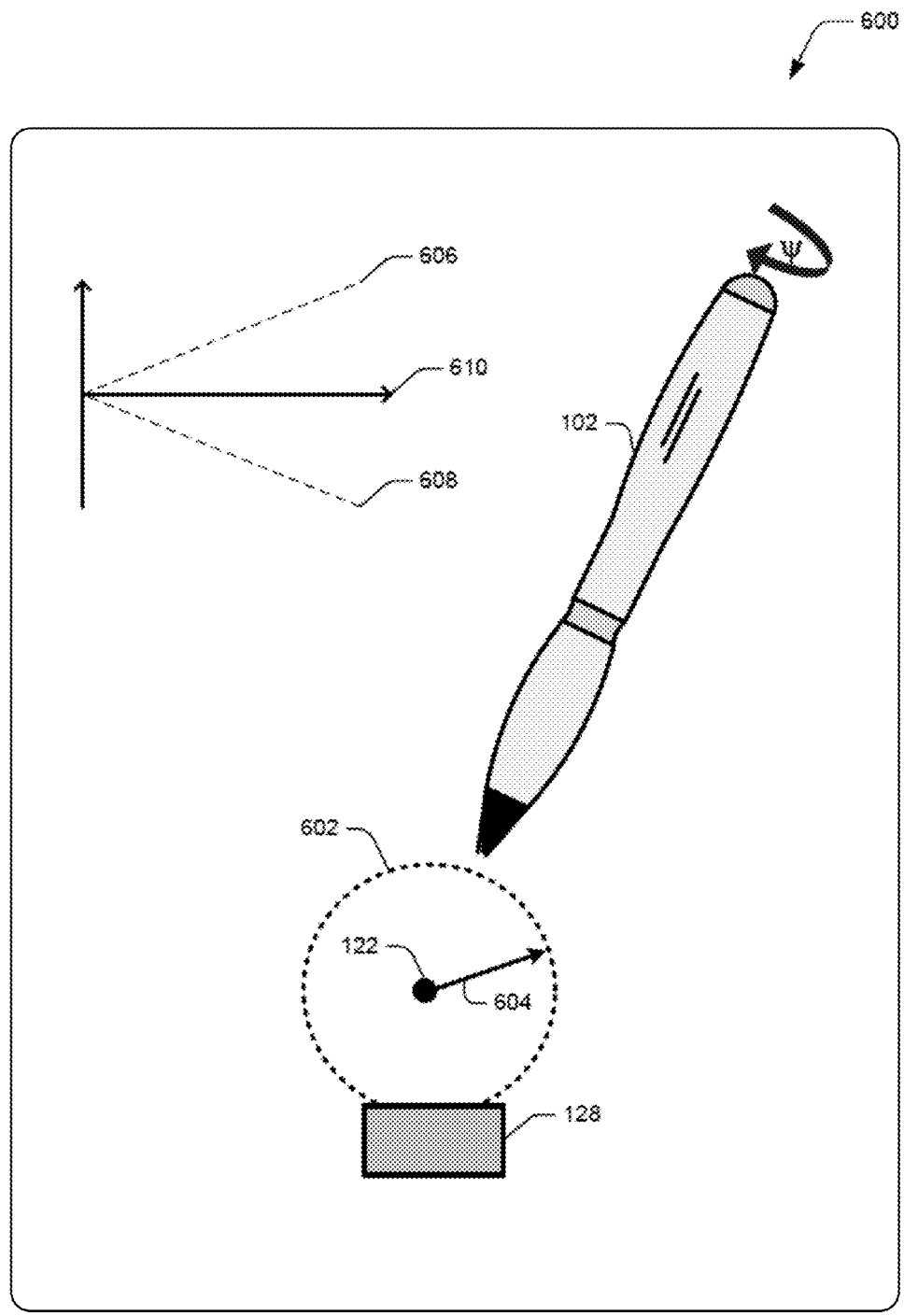
FIG. 6 illustrates an example of the writing tip offset of the electronic writing device.

Consider, for example, FIG. 6 which illustrates an example 600 of the writing tip offset of electronic writing device 102. In this example, electronic writing device 102 is rotated around the longitudinal axis of electronic writing device 102, such as by the user placing writing tip 122 on writing surface 104 and twisting the device along its longitudinal axis. This causes positional sensor 128 to sense movement, even though the writing tip itself is not actually moving on writing surface 104. Responsively, positional sensor 128 generates writing data 602 which is offset from writing tip 122 by a distance 604, which corresponds to the writing tip offset of positional sensor 128.

To correct for this offset, an X-Offset correction 606 and Y-Offset correction 608 are calculated and used to calculate a writing tip offset correction angle 610 of electronic writing device 102. The X and Y-Offset corrections can be determined from design data or a one-time calibration process in which the user spins electronic writing device 102 on writing tip 122 to enable the device to measure the offset values.

Selector Component

A single positional sensor 128 may be unable to detect movement of electronic writing device 102 at certain roll angles and pitch angles. The roll angle of electronic writing device 102 corresponds to the rotation of the device along its longitudinal axis, and thus can be measured directly with gyroscope 130 using the gyroscope's z-axis sensor which is positioned along the longitudinal axis of the electronic writing device.

The "pitch angle" of electronic writing device 102 corresponds to the angle at which electronic writing device 102 is held relative to writing surface 104. Thus, the pitch angle corresponds to the amount the user tilts the electronic writing device when writing. As described in more detail below, the positional sensor may be unable to detect movement of the device when the device is tilted such that the device is positioned substantially horizontal to writing surface 104.

Figure 7:
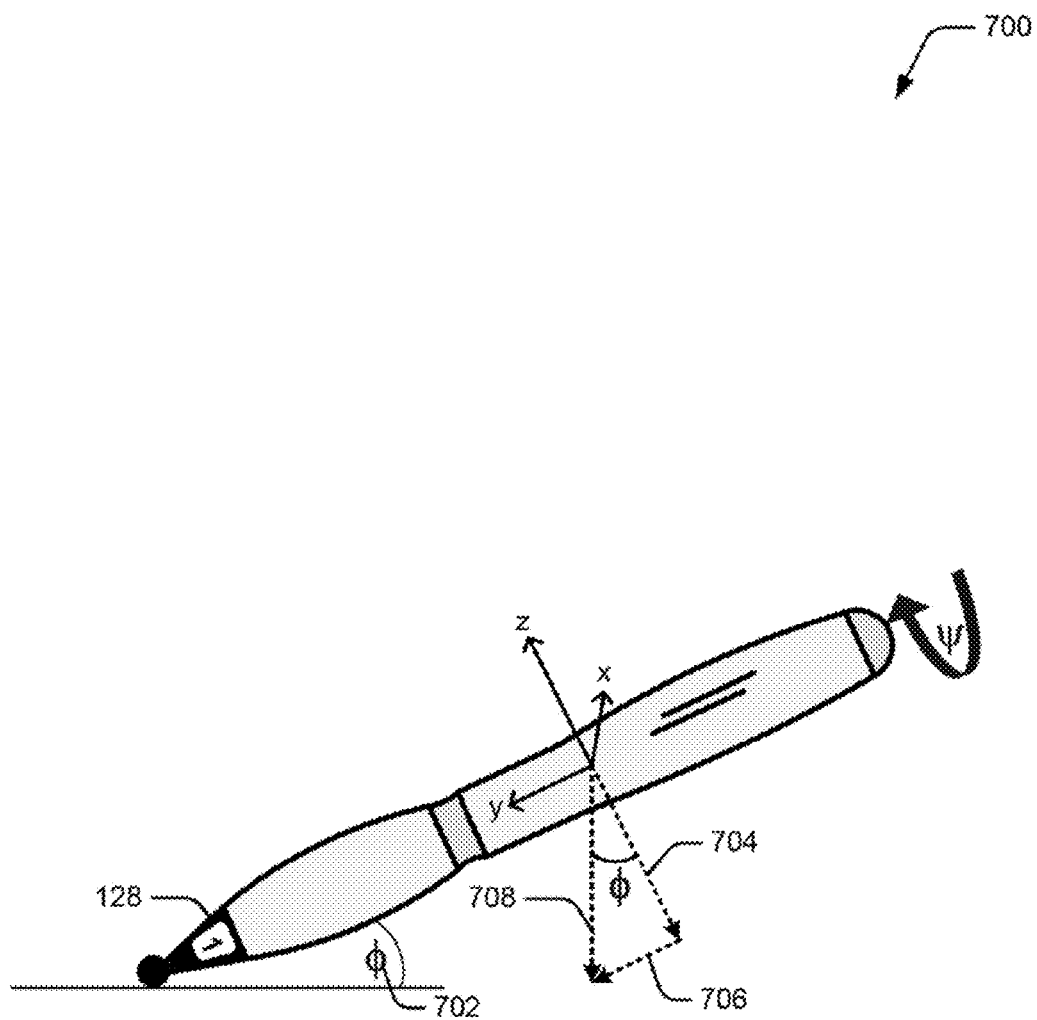
FIG. 7 illustrates an example of calculating a pitch angle of the electronic writing device.

Selector component 116 is configured to calculate the pitch angle using acceleration data from accelerometer 128. Consider, for example, FIG. 7 which illustrates an example 700 of calculating a pitch angle of the electronic writing device. In example 700, a pitch angle 702 corresponds to the angle between electronic writing device 102 and writing surface 104. Initially, the 3-axis accelerometer 128 is able to determine pitch angle 702 by calculating a z-acceleration vector 704 corresponding to acceleration of the device in the z-direction and a y-acceleration vector 706 corresponding to acceleration of the device in the y-direction. Accelerometer 128 can also detect the value of gravity pulling down on electronic writing device 102. This value can be passed to a low-pass filter to generate a gravity vector 708 corresponding to the gravity pulling down on electronic writing device 102. Selector component 116 uses these vectors to determine pitch angle 702 by calculating the angle between z-acceleration vector 704 and gravity vector 708. After the pitch angle is initially calculated, gyroscope 130 can be used to track changes in the pitch angle.

When electronic writing device 102 is positioned substantially horizontal to writing surface 104, and thus has a small pitch angle, the roll angle of the device may affect the field of view of the positional sensor. For example, if the device is tilted almost horizontal to the writing surface, the positional sensor may be unable to focus on writing surface 104 depending on the position of the positional sensor relative to writing surface 104.

Figure 8:
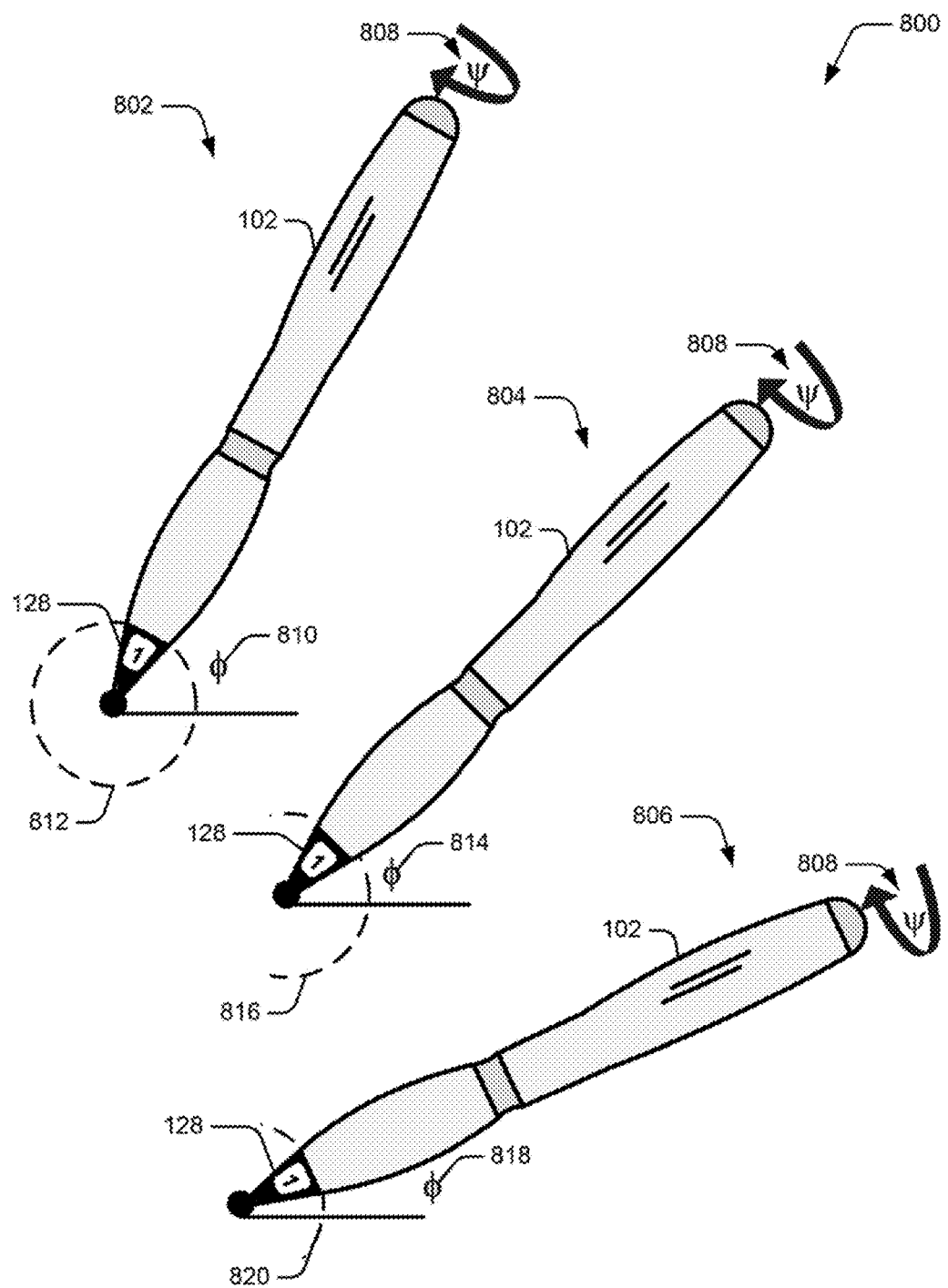
FIG. 8 illustrates an example of rotating electronic writing device about the longitudinal axis of the device at different pitch angles.

Consider, for example, FIG. 8 which illustrates an example 800 of rotating electronic writing device about the longitudinal axis of the device at different pitch angles. In example 800, electronic writing device 102 is rotated about its longitudinal axis in a complete rotation (e.g., 360 degrees) at three different pitch angles: a large pitch angle at 802, a medium pitch angle at 804, and a small pitch angle at 806. A roll angle of electronic writing device 102 is indicated at 808.

At 802, electronic writing device 102 is rotated at a large pitch angle 810, meaning that electronic writing device 102 is positioned substantially vertical to writing surface 104. In this example, pitch angle 810 of electronic device is close to 90 degrees. Positional sensor 128, indicated by the identifier "1", is positioned near writing tip 122 on a side of the electronic writing device. At large pitch angle 810, positional sensor 128 is able to sense movement of the electronic writing device at each roll angle between 0 and 360 degrees. Thus, positional sensor 128 generates writing data 812 that corresponds to the complete rotation of the electronic writing device.

At 804, electronic writing device 102 is rotated at a medium pitch angle 814 that is less than 45 degrees. Note that the electronic writing device is tilted towards writing surface 104 so that the device is oriented substantially horizontal to writing surface 104. At medium pitch angle 814, positional sensor 128 is unable to sense movement of the electronic writing device at some roll angles. For example, when electronic writing device 102 is held such that the positional sensor is positioned on the side of the device which is furthest from writing surface 104, the positional sensor may be unable to view writing surface. As such, positional sensor may be unable to track movement of the device. In this example, therefore, positional sensor 128 generates writing data 816 that corresponds to just a portion of the complete rotation of the electronic writing device.

At 806, electronic writing device 102 is rotated at a small pitch angle 818, meaning that electronic writing device 102 is almost completely horizontal to writing surface 104. At small pitch angle 818, positional sensor 128 is unable to sense movement of the electronic writing device at most roll angles. Thus, positional sensor 128 generates writing data 820 that corresponds to an even smaller portion of the complete rotation of electronic writing device 102.

Sensor Select Mode

In various embodiments, selector component 116 is configured to initiate a sensor select mode when the pitch angle of the device is less than a threshold. The threshold may correspond to the electronic writing device being positioned substantially horizontal to writing surface 104 (e.g., with a medium or small pitch angle). Thus, the sensor select mode is initiated when positional sensor 128 is unable to track a complete rotation of the device.

In some embodiments, in order to track movement of the device at medium and low pitch angles, electronic writing device 102 is configured with two or more positional sensors 128. In these embodiments, selector component 116 is configured to initiate the sensor select mode by dynamically enabling one of the two or more positional sensors to sense movement of electronic writing device 102 based on the roll angle and the pitch angle of electronic writing device 102. Selector component 116 dynamically enables the positional sensor 128 with the greatest field of view of writing surface 104 at the current pitch and roll angle of the device. This allows electronic writing device 102 to generate writing data for each roll angle within a complete 360 degree rotation of the device, even at medium and small pitch angles.

Figure 9A:
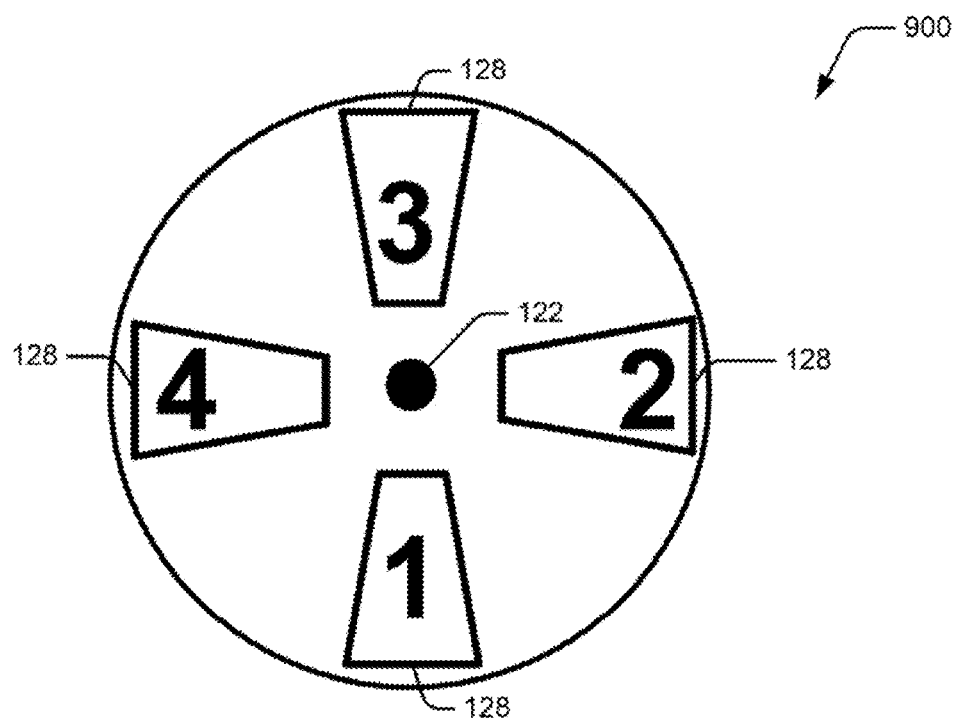
FIG. 9a illustrates an example of the electronic writing device configured with two or more positional sensors in accordance with one or more embodiments.

Consider, for example, FIG. 9a which illustrates an example 900 of electronic writing device 102 configured with two or more positional sensors 128 in accordance with one or more embodiments. In this example, electronic writing device 102 includes four positional sensors 128 positioned around writing tip 122, indicated as positional sensor 1, 2, 3, and 4. It is to be appreciated, however, that any number of positional sensors may be used.

At large pitch angles, the sensor select mode may be disabled because a single sensor is able to track the complete rotation of the electronic writing device. In FIG. 9a, for example, at large pitch angles positional sensor 1 is able to track the complete rotation of the device.

However, when selector component 116 determines that the pitch angle of the device is below the threshold, the sensor select mode is enabled. When the sensor select mode is enabled, selector component enables the positional sensor with the greatest field of view of writing surface 104 based on the roll angle of the device. When a positional sensor is enabled, the other positional sensors are disabled or powered off. Consider, for example, that in FIG. 9a that the sensor select mode is enabled and positional sensor 1 is currently enabled. In this example, if electronic writing device 102 is rotated 90 degrees clockwise, the selector component detects the change in roll angle and dynamically enables positional sensor 2.

In other embodiments, in order to track movement of the device at medium and low pitch angles, electronic writing device 102 includes at least two lenses configured to direct light to a single positional sensor 128. In these embodiments, selector component 116 is configured to initiate the sensor select mode by dynamically opening one of the at least two lenses based on the roll angle and the pitch angle of the electronic writing device. Selector component 116 opens the lens with the greatest field of view of writing surface 104 at the current pitch and roll angle of the device. This allows electronic writing device 102 to generate writing data for each roll angle within a complete 360 degree rotation of the device, even at medium and small pitch angles.

Figure 9B:
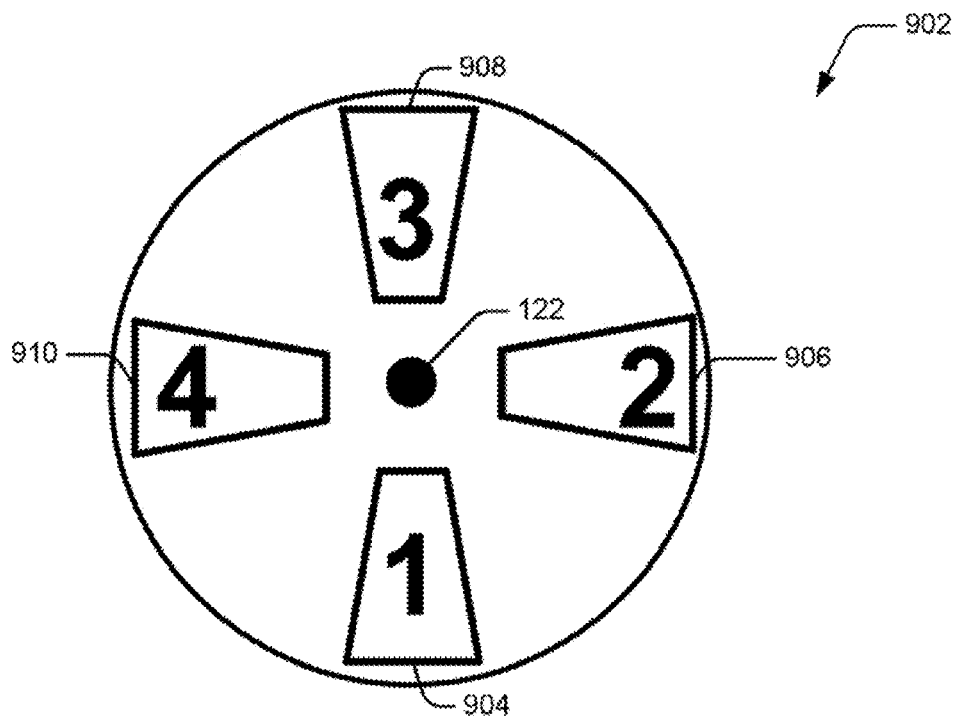
FIG. 9b illustrates an example of the electronic writing device configured with two or more lenses in accordance with one or more embodiments.

Consider, for example, FIG. 9b which illustrates an example 902 of electronic writing device 102 configured with two or more lenses in accordance with one or more embodiments. In this example, electronic writing device 102 includes four lenses, a first lens 904, a second lens 906, a third lens 908, and a fourth lens 910. It is to be appreciated, however, that any number of lenses may be used. Each of the lenses may be implemented as a controllable aperture which can be controlled by selector component 116 to open or close. When open, each lens directs light to positional sensor 128 which is positioned within the body of electronic writing device 102. For example, each lens may include an electronically controllable light gating device, such as an LCD, that can be controlled by selector component 116 to be open or closed. When selector component 116 opens a lens, the other lenses are closed.

At large pitch angles, the sensor select mode may be disabled because a single lens can direct light to positional sensor 128 for the complete rotation of the electronic writing device. In FIG. 9b, for example, at large pitch angles first lens 904 is able to track the complete rotation of the device.

However, when selector component 116 determines that the pitch angle of the device is below the threshold, the sensor select mode is enabled. When the sensor select mode is enabled, selector component selects the lens with the greatest field of view of writing surface 104 based on the roll angle of the device. For example, in FIG. 9b, if the sensor select mode is enabled and electronic writing device 102 is rotated 90 degrees clockwise, the selector component may detect the change in roll angle based on rotation data from the gyroscope and dynamically open second lens 906 (and close first lens 904). In other words, based on the rotation angle, if lens 906 is most optimal for tracking, then it is opened for light to travel to positional sensor 128 while the other lenses are closed.

Power-Saving Component

In one or more implementations, electronic writing device 102 includes a power-saving component 118 that is configured to implement a power-saving mode for electronic writing device 102. In the power-saving mode, power-saving component 118 dynamically enables and disables sensors 124 based on a current state of the device.

In one or more implementations, the power-saving component uses a low-power sensor 124 to detect the current state of electronic writing device 102, and then triggers other higher-power sensors 124. In this way, the sensors that consume the most battery power are enabled when they are needed, and disabled when they are not needed. In one or more embodiments, accelerometer 132 is used as the low-power sensor that determines the various states of electronic writing device 102. Accelerometer data can be used to determine whether electronic writing device 102 is moving or not moving. Accelerometer data can also be used to determine the initial roll and pitch angles of electronic writing device 102, and thus can trigger the sensor select mode. Surface touch sensor 134 can also be used, alone or in combination with accelerometer 132, as the low-power sensor. Surface touch sensor 134 can be used to determine when the device is not writing by indicating that the writing tip 122 is not in contact with writing surface 104.

Figure 10:
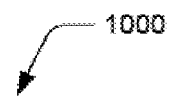
FIG. 10 illustrates an example of a look-up table used by a power-saving component of the electronic writing device to conserve battery power.

FIG. 10 illustrates an example of a look-up table 1000 used by power-saving component 118 of electronic writing device 102 to conserve battery power. Look-up table 1000 indicates which sensors are enabled for various power-saving states of electronic writing device 102.

The first power-saving state listed in lookup table 1000 is "on". This power-saving state is detected by power-saving component 118 when electronic writing device 102 is powered on. In this power-saving state, surface touch sensor 134 is off, accelerometer 132 is on, gyroscope 130 is off, positional sensors 128 are off, the sensor select mode is off, and a writing error alert is off.

Thus, when the device is first switched on, only the accelerometer is enabled by power-saving component 118. Power-saving component 118 does not enable other sensors 124 until the device starts being used, which can be determined by accelerometer data. For example, a user may power on electronic writing device 102 a few minutes before the user actually begins to use the electronic writing device. However, there is no reason to enable the other sensors until the device is being used. Further, if the user powers on electronic writing device 102, but then leaves the device on a table without using the device, power-saving component 118 may power off the device after a few minutes of non-use.

The second power-saving state listed in lookup table 1000 is "off". This power-saving state is detected by power-saving component 118 when electronic writing device 102 is powered off. In this power-saving state, all of the sensors 124 are turned off because the device is not being used.

The third power-saving state listed in lookup table 1000 is "large pitch angle", which corresponds to the electronic writing device writing while substantially vertical to writing surface 104. This power-saving state is detected by power-saving component 118 when electronic writing device 102 is powered on, the surface touch sensor 134 indicates writing tip 122 is on writing surface 104, and the accelerometer 132 detects movement of the device. In this power-saving state, surface touch sensor 134 is on, accelerometer 132 is on, gyroscope 130 is on, positional sensors 128 are on, the sensor select mode is off, and a writing error alert is off.

The fourth power-saving state listed in lookup table 1000 is "paused writing". This state may be detected by power-saving component 118 when there is a pause in the writing, which may correspond to the device being in contact with writing surface 104 but not moving. In this power-saving state, accelerometer 132 is left on to detect when the electronic writing device begins moving again. Further, positional sensors 128 are left on so that any movement of the device can be detected quickly. However, to save battery power, power-saving component 118 turns off gyroscope 130.

The fifth power-saving state listed in lookup table 1000 is "small pitch angle", which corresponds to the electronic writing device writing while oriented substantially horizontal to writing surface 104. This power-saving state is detected by power-saving component 118 when electronic writing device 102 is powered on, the surface touch sensor 134 indicates writing tip 122 is on writing surface 104, and a small pitch angle is detected. In this power-saving state all of sensors 124 are enabled, and selector component 116 initiates the sensor select mode. In one or more embodiments, selector component 116 may initiate a writing error alert if the electronic writing device is oriented at an angle that writing cannot be detected. The writing error alert could be implemented as a beep or vibration of the device that indicates to the user that writing is not being detected.

It is to be appreciated that look-up table 1000 is just one example of the various power-saving states, and that different or additional power-saving states may be used by power-saving component 118.

Example Methods

Figure 11:
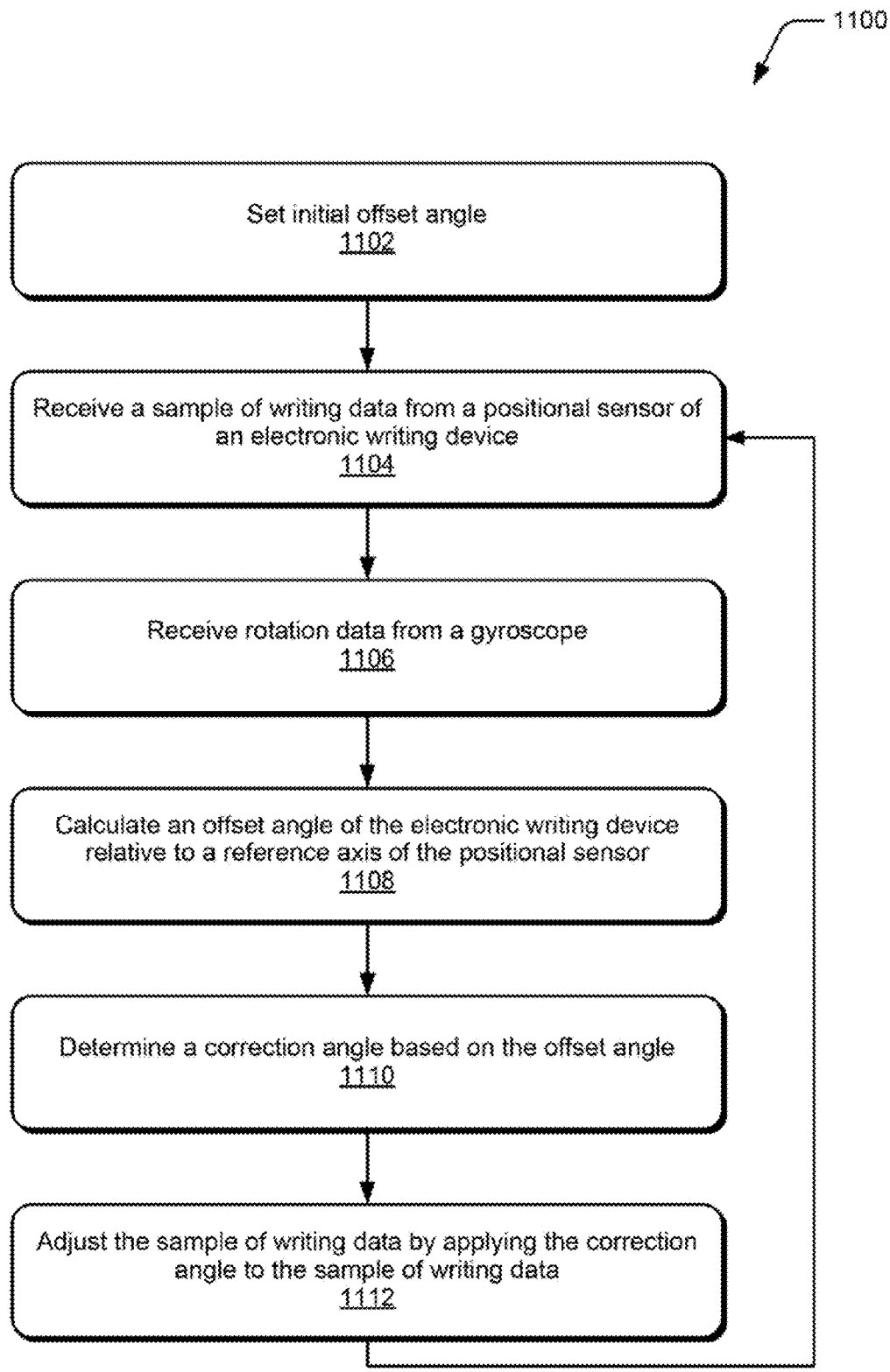
FIG. 11 illustrates an example method of correcting writing data using rotation data from a gyroscope in accordance with one or more embodiments.
Figure 12:
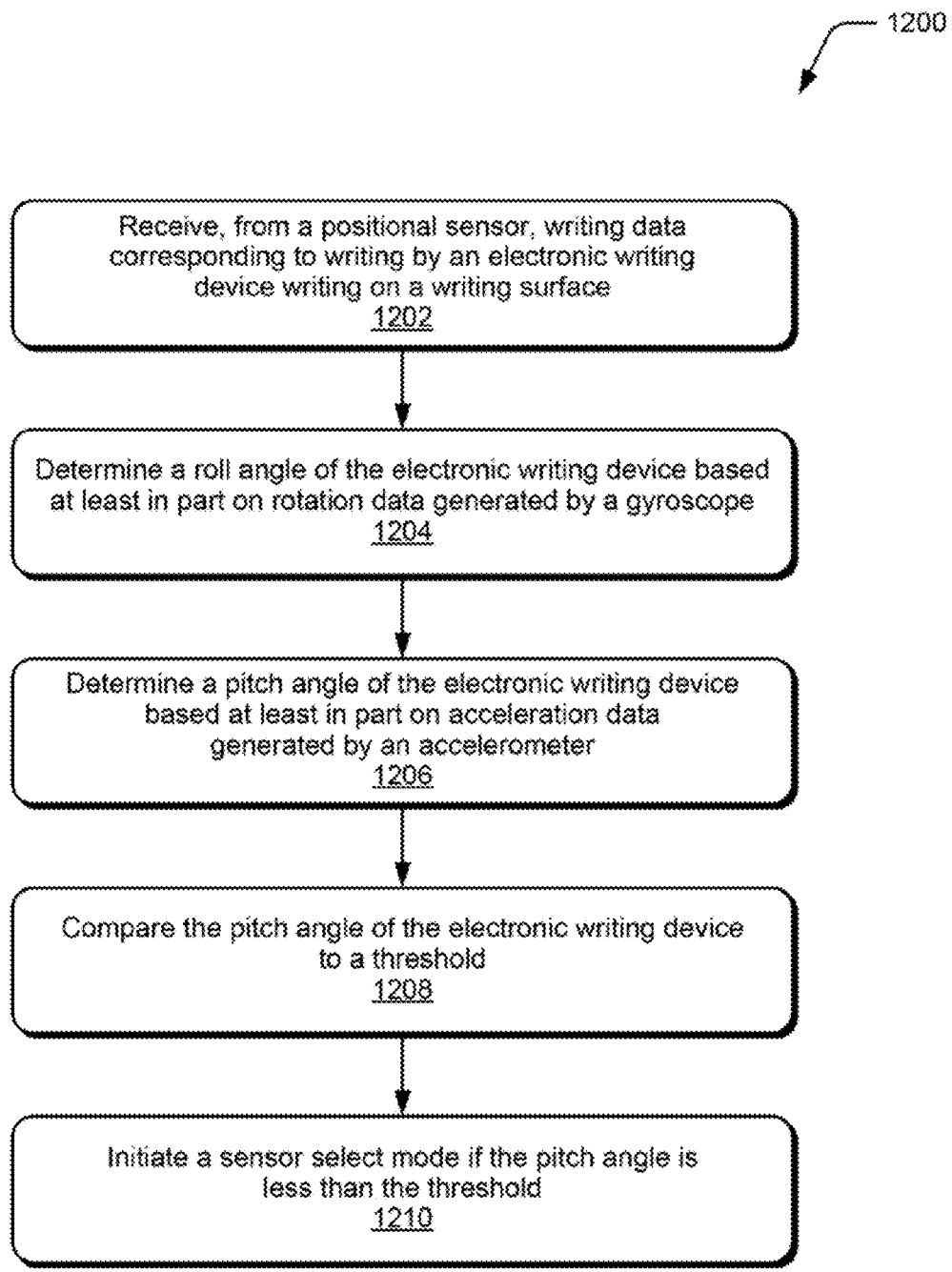
FIG. 12 illustrates an example method of a sensor select mode in accordance with one or more embodiments.

FIGS. 11 and 12 illustrate example methods 1100 and 1200 of correcting writing data generated by the electronic writing device in accordance with one or more embodiments. The order in which the method blocks are described are not intended to be construed as a limitation, and any number or combination of the described method blocks can be combined in any order to implement a method, or an alternate method. Generally, any of the methods, components, and modules described herein can be implemented using software, firmware, hardware (e.g., fixed logic circuitry), manual processing, or any combination thereof. A software implementation represents program code that performs specified tasks when executed by a computer processor, and the program code can be stored in computer-readable storage media devices.

FIG. 11 illustrates an example method 1100 of correcting writing data using rotation data from a gyroscope in accordance with one or more embodiments.

Block 1102 sets an initial offset angle. For example, correction component 114 (FIG. 1) sets an initial offset angle to a value of 0.

Block 1104 receives a sample of writing data from a positional sensor of an electronic writing device. For example, correction component 114 receives a sample of writing data 404 (FIG. 4) from positional sensor 128 of electronic writing device 102.

Block 1106 receives rotation data from a gyroscope. For example, correction component 114 receives rotation data from gyroscope 130 that corresponds to rotation of electronic writing device 102.

Block 1108 calculates an offset angle of the electronic writing device relative to a reference axis of the positional sensor based at least in part on the rotation data. For example, correction component 114 calculates an offset angle of electronic writing device 102 relative to a reference axis of positional sensor 128. In one or more implementations, the offset angle is calculated by integrating the rotation data received from gyroscope 130. The offset angle corresponds to the offset of electronic writing device 102 relative to the reference axis of positional sensor 128.

Block 1110 determines a correction angle based on the offset angle. For example, correction component 114 determines a correction angle 406 based on the offset angle determined at block 1108. In one or more embodiments, correction component 114 determines the correction angle by calculating a sum of the offset angle and the previously-calculated offset angle. For the first sample of writing data, however, the correction angle is equal to the initial offset angle calculated at step 1108 because the initial offset angle is set to a value of 0 at step 1102. For a second sample, however, the correction angle will be equal to the sum of the offset angle calculated for the first sample and the offset angle calculated for the second sample, and so on.

Block 1112 adjusts the sample of writing data by applying the correction angle to the sample of writing data. For example, correction component 114 adjusts each sample of writing data 404 by applying correction angle 406 to each sample to generate corrected writing data 408. To do so, correction component 114 adjusts the X-coordinate and Y-coordinate each sample of writing data using the correction angle. In one or more embodiments, an adjusted X-coordinate of each sample of writing data is calculated by multiplying the X-coordinate of the writing data by a cosine of the correction angle. Similarly, an adjusted Y-coordinate of each sample of writing data is calculated by multiplying the Y-coordinate of the writing data by a sine of the correction angle.

Correction component 114 then proceeds to correct a next sample of the writing data by proceeding back to block 1104, and the method repeats for each sample of the writing data.

FIG. 12 illustrates an example method 1200 of a sensor select mode in accordance with one or more embodiments.

Block 1202 receives, from a positional sensor, writing data corresponding to writing by an electronic writing device on a writing surface. For example, selector component 116 (FIG. 1) receives, from positional sensor 128, writing data corresponding to writing by electronic writing device 102 writing on writing surface 104.

Block 1204 determines a roll angle of the electronic writing device based at least in part on rotation data generated by a gyroscope. For example, selector component 116 determines a roll angle of electronic writing device 102 based at least in part on rotation data generated by gyroscope 130. The roll angle corresponds to rotation of electronic writing device 102 along a longitudinal axis of the device.

Block 1206 determines a pitch angle of the electronic writing device based at least in part on acceleration data generated by an accelerometer. For example, selector component 116 determines a pitch angle of electronic writing device 102 based at least in part on acceleration data generated by accelerometer 132. The pitch angle corresponds to an angle between electronic writing device 102 and writing surface 104 when writing tip 122 of electronic writing device 102 is in contact with writing surface 104.

Block 1208 compares the pitch angle of the electronic writing device to a threshold, and block 1210 initiates a sensor select mode if the pitch angle is less than the threshold. For example, selector component 116 compares the pitch angle of electronic writing device 102 to a threshold, and initiates a sensor select mode if the pitch angle is less than the threshold. When the pitch angle is less than the threshold, electronic writing device 102 is positioned substantially horizontal to writing surface 104 (e.g., with a medium or small pitch angle).

In some embodiments, in the sensor select mode the selector component is configured to enable one of at least two positional sensors to sense the movement of the electronic writing device based on the roll angle and the pitch angle of the electronic writing device. The enabled sensor is selected by selector component 116 because it has the greatest field of view of the writing surface relative to the other positional sensors.

In other embodiments, in the sensor select mode the selector component is configured to open one of at least two lenses to enable light to pass to the positional sensor based on the roll angle and the pitch angle of the electronic writing device. The opened lens is selected by the selector component 116 because it has the greatest field of view of the writing surface relative to the other lenses.

Figure 13:
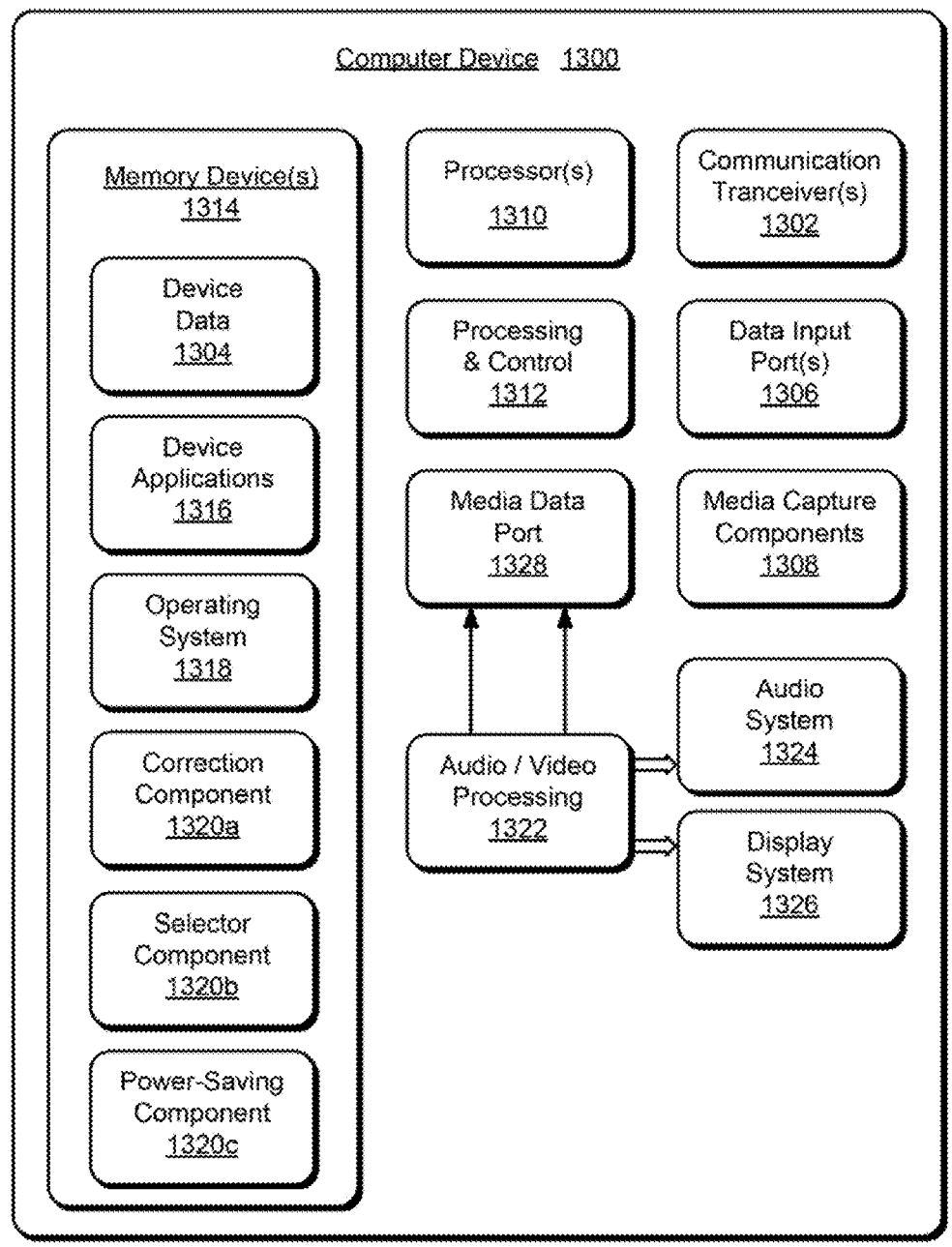
FIG. 13 illustrates various components of an example computer device that can implement embodiments of correcting writing data generated by an electronic writing device.

FIG. 13 illustrates various components of an example computer device 1300 that can implement embodiments of correcting writing data generated by an electronic writing device. For example, the computer device 1300 may be implemented as any type of electronic writing device that can write on a writing surface, such as a piece of paper, and generate electronic writing data corresponding to the writing on the writing surface.

The computer device 1300 includes communication transceivers 1302 that enable wired and/or wireless communication of device data 1304, such as received data, data that is being received, data scheduled for broadcast, data packets of the data, etc. Example communication transceivers 1302 include wireless personal-area-network (WPAN) radios compliant with various IEEE 802.15 standards, Bluetooth™ standards, wireless local-area-network (WLAN) radios compliant with any of the various IEEE 802.11 (also referred to as WiFi™) standards, wireless-wide-area-network (WWAN) radios for cellular telephony, wireless-metropolitan-area-network (WMAN) radios compliant with various IEEE 802.16 (also referred to as WiMAX™) standards, and wired local-area-network (LAN) Ethernet transceivers.

The computer device 1300 may also include one or more data input ports 1306 via which any type of data, media content, and/or inputs can be received, such as user-selectable inputs, messages, music, television content, recorded video content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the computer device to components, peripherals, or accessories such as microphones or cameras. Additionally, the computer device 1300 may include media capture components 1308, such as an integrated microphone to capture audio and a camera to capture still images and/or video media content.

The computer device 1300 includes one or more processors 1310 (e.g., any of microprocessors, controllers, and the like), which process computer-executable instructions to control operation of the device. Alternatively or in addition, the computer device can be implemented with any one or combination of software, hardware, firmware, or fixed logic circuitry that is implemented in connection with processing and control circuits, which are generally identified at 1312. Although not shown, the computer device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computer device 1300 also includes one or more memory devices 1314 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The computer device 1300 may also include a mass storage media device.

A memory device 1314 provides data storage mechanisms to store the device data 1304, other types of information and/or data, and various device applications 1316 (e.g., software applications). For example, an operating system 1318 can be maintained as software instructions within a memory device and executed on the processors 1310. The device applications may also include a device manager, such as any form of a control application, software application, signal-processing and control module, code that is native to a particular device, a hardware abstraction layer for a particular device, and so on. In embodiments, the computer device also includes a correction component 1320a, a selector component 1320b, and a power-saving component 1320c. Correction component 1320a, selector component 1320b, and power-saving component 1320c are examples of correction component 114, selector component 116, and power-saving component 118, respectively, shown in FIG. 1.

The computer device 1300 also includes an audio and/or video processing system 1322 that generates audio data for an audio system 1324 and/or generates display data for a display system 1326. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1328. Additionally, the audio system and/or the display system may be external components to the computer device, or alternatively, are integrated components of the example computer device.

Although embodiments of correcting writing data generated by an electronic writing device have been described in language specific to features and/or methods, the subject of the appended claims is not necessarily limited to the specific features or methods described. Rather, the specific features and methods are disclosed as example implementations of correcting writing data generated by an electronic writing device.

The invention claimed is:

1. An electronic writing device comprising:
    a writing tip to enable writing on a writing surface;
    a positional sensor configured to sense, based at least in part on light received at the positional sensor, movement of the electronic writing device when writing on the writing surface, and generate writing data corresponding to the movement of the electronic writing device;
    a gyroscope configured to sense rotation of the electronic writing device and generate rotation data corresponding to the rotation;
    an accelerometer configured to sense acceleration of the electronic writing device and generate acceleration data corresponding to the acceleration of the electronic writing device;
    at least two lenses, each lens of the at least two lenses including a controllable aperture configured to selectively direct light to the positional sensor; and
    at least a memory and a processor to implement:
        a selector component configured to:
            determine a pitch angle of the electronic writing device from the acceleration data; and
            open the controllable aperture of one of the at least two lenses based on the pitch angle and a roll angle of the electronic writing device; and
        a correction component configured to determine the roll angle,
        the correction component further configured to, for a sample of the writing data generated by the positional sensor:
            calculate an offset angle of the electronic writing device relative to a reference axis of the positional sensor based at least in part on the rotation data generated by the gyroscope;
            determine a correction angle based on the offset angle; and
            adjust the sample of the writing data by applying the correction angle to the sample of the writing data.

2. The electronic writing device of claim 1, wherein the gyroscope comprises a three-axis gyroscope that is configured to sense rotation of the electronic writing device along a longitudinal axis of the electronic writing device, and along an x-axis and y-axis of the electronic writing device which are orthogonal to the longitudinal axis.

3. The electronic writing device of claim 2, wherein the correction component is configured to determine the roll angle of the electronic writing device based on the rotation data generated by the gyroscope, the roll angle corresponding to the rotation of the electronic writing device along the longitudinal axis of the electronic writing device.

4. The electronic writing device of claim 3, wherein the accelerometer includes a three-axis accelerometer configured to sense acceleration of the electronic writing device in x, y, and z directions, the acceleration data corresponding to the acceleration of the electronic writing device in the x, y, and z directions.

5. The electronic writing device of claim 4, wherein the selector component is configured to determine the pitch angle of the electronic writing device using the acceleration data, the pitch angle corresponding to an angle between the electronic writing device and the writing surface when the writing tip of the electronic writing device is placed on the writing surface.

6. The electronic writing device of claim 5, wherein the electronic writing device includes at least two positional sensors, and wherein the selector component is further configured to enable one of the at least two positional sensors to sense the movement of the electronic writing device based on the roll angle and the pitch angle of the electronic writing device.

7. The electronic writing device of claim 6, wherein the selector component is configured to enable one of the least two positional sensors by:
    monitoring the pitch angle of the electronic writing device;
    comparing the pitch angle to a threshold; and
    if the pitch angle is less than the threshold corresponding to the electronic writing device being positioned substantially horizontal to the writing surface, dynamically enabling one of the at least two positional sensors based on the roll angle of the electronic writing device.

8. The electronic writing device of claim 1, wherein the selector component is configured to open the controllable aperture of the one of the at least two lenses by:
    monitoring the pitch angle of the electronic writing device;
    comparing the pitch angle to a threshold; and
    if the pitch angle is less than the threshold corresponding to the electronic writing device being positioned substantially horizontal to the writing surface, dynamically opening the controllable aperture of the one of the at least two lenses based on the roll angle of the electronic writing device.

9. The electronic writing device of claim 1, wherein the at least a memory and a processor are further configured to implement a power-saving component, the power-saving component configured to:
    determine a power-saving state of the electronic writing device based at least in part on the acceleration data generated by the accelerometer; and
    enable or disable one or both of the positional sensor and the gyroscope based on the determined power-saving state of the electronic writing device.

10. The electronic writing device of claim 1, wherein the correction component is configured to calculate the offset angle by integrating the rotation data.

11. The electronic writing device of claim 1, wherein the correction component is configured to generate the correction angle by calculating a sum of the offset angle and a previously-calculated offset angle.

12. The electronic writing device of claim 1, wherein the positional sensor comprises an optical sensor.

13. The electronic writing device of claim 1, wherein the electronic writing device comprises an electronic pen.

* * * * *